(12) United States Patent
Short

(10) Patent No.: US 8,905,689 B2
(45) Date of Patent: Dec. 9, 2014

(54) ULTRASONIC MACHINING ASSEMBLY FOR USE WITH PORTABLE DEVICES

(75) Inventor: Matthew A. Short, Grove City, OH (US)

(73) Assignee: Edison Welding Institute, Columbus, OH (US)

( * ) Notice: Subject to any disclaimer, the term of this patent is extended or adjusted under 35 U.S.C. 154(b) by 876 days.

(21) Appl. No.: 13/094,936

(22) Filed: Apr. 27, 2011

(65) Prior Publication Data

US 2011/0268516 A1 Nov. 3, 2011

Related U.S. Application Data

(63) Continuation-in-part of application No. 13/046,099, filed on Mar. 11, 2011.

(60) Provisional application No. 61/329,355, filed on Apr. 29, 2010, provisional application No. 61/333,483, filed on May 11, 2010.

(51) Int. Cl.
*B23B 37/00* (2006.01)
*B23Q 5/04* (2006.01)
*B23B 29/12* (2006.01)

(52) U.S. Cl.
CPC . *B23Q 5/04* (2013.01); *B23B 37/00* (2013.01); *B23B 2270/10* (2013.01); *B23B 29/125* (2013.01); *Y10S 408/70* (2013.01)
USPC ....... 408/129; 408/700; 279/103; 310/323.18

(58) Field of Classification Search
CPC .... B23B 37/00; B23B 29/125; B23B 2270/10
USPC ............ 408/17, 124, 129, 700; 279/102, 103; 30/323.18
IPC ......................................................... B23B 37/00
See application file for complete search history.

(56) References Cited

U.S. PATENT DOCUMENTS

| | | | | |
|---|---|---|---|---|
| 2,452,211 A | * | 10/1948 | Rosenthal | 451/37 |
| 2,651,148 A | * | 9/1953 | Carwile | 451/165 |
| 3,105,482 A | * | 10/1963 | Mieville | 125/30.01 |

(Continued)

FOREIGN PATENT DOCUMENTS

| | | | | |
|---|---|---|---|---|
| CH | | 671530 A5 * | 9/1989 | B06B 1/06 |
| CN | | 201082507 Y * | 7/2008 | |

(Continued)

OTHER PUBLICATIONS

International Search Report and Written Opinion received in PCT/US2011/034144, mailed Jul. 27, 2011.

*Primary Examiner* — Eric A Gates
(74) *Attorney, Agent, or Firm* — McNees, Wallace & Nurick, LLC

(57) ABSTRACT

A machining system that includes an ultrasonic machining assembly, wherein the ultrasonic machining assembly further includes a machining tool; a collet adapted to receive the machining tool; and an ultrasonic transducer, wherein the ultrasonic transducer is operative to transmit acoustical vibrations to the machining tool; and a machining apparatus, wherein the machining apparatus is adapted to receive and secure the ultrasonic machining assembly, and wherein the machining apparatus is operative to transmit torque to the machining tool by applying rotary motion to the ultrasonic machining assembly.

17 Claims, 4 Drawing Sheets

(56) References Cited

U.S. PATENT DOCUMENTS

| | | | |
|---|---|---|---|
| 3,283,182 A * | 11/1966 | Jones et al. | 310/325 |
| 3,471,724 A * | 10/1969 | Balamuth | 310/26 |
| 3,482,360 A * | 12/1969 | Legge | 451/24 |
| 3,503,122 A * | 3/1970 | Albrektson | 29/558 |
| 3,511,323 A * | 5/1970 | Riley, Jr. | 173/117 |
| 3,561,462 A * | 2/1971 | Jugler | 173/199 |
| 3,614,484 A * | 10/1971 | Shoh | 310/325 |
| 3,619,671 A | 11/1971 | Shoh | |
| 3,689,783 A | 9/1972 | Williams | |
| 4,026,143 A * | 5/1977 | Holland | 73/596 |
| 4,118,139 A * | 10/1978 | Lemelson | 408/12 |
| 4,425,115 A | 1/1984 | Wuchinich | |
| 4,582,239 A | 4/1986 | Scotto | |
| 4,596,171 A * | 6/1986 | Gerber | 83/56 |
| 4,647,336 A | 3/1987 | Coenen et al. | |
| 4,828,052 A * | 5/1989 | Duran et al. | 175/55 |
| 4,934,103 A * | 6/1990 | Campergue et al. | 451/165 |
| 4,995,938 A * | 2/1991 | Tsutsumi | 156/580.1 |
| 5,140,773 A | 8/1992 | Miwa et al. | |
| 5,171,387 A | 12/1992 | Wuchinich | |
| 5,361,543 A * | 11/1994 | Bory | 451/165 |
| 5,440,190 A | 8/1995 | Imabayashi et al. | |
| 5,443,240 A | 8/1995 | Cunningham | |
| 5,527,273 A | 6/1996 | Manna et al. | |
| 5,541,467 A | 7/1996 | Kaida et al. | |
| 5,590,866 A | 1/1997 | Cunningham | |
| 5,733,074 A | 3/1998 | Stock | |
| 5,976,316 A | 11/1999 | Mlinar et al. | |
| 6,171,415 B1 | 1/2001 | Statnikov | |
| 6,177,755 B1 * | 1/2001 | Hur | 310/346 |
| 6,204,592 B1 * | 3/2001 | Hur | 310/323.18 |
| 6,278,218 B1 | 8/2001 | Madan et al. | |
| 6,289,736 B1 | 9/2001 | Statnikov | |
| 6,338,765 B1 | 1/2002 | Statnikov | |
| 6,458,225 B1 | 10/2002 | Statnikov | |
| 6,676,003 B2 | 1/2004 | Ehlert et al. | |
| 6,731,047 B2 * | 5/2004 | Kauf et al. | 310/317 |
| 6,762,535 B2 | 7/2004 | Take et al. | |
| 6,932,876 B1 | 8/2005 | Statnikov | |
| 6,984,921 B1 | 1/2006 | Kosterman | |
| 7,173,362 B2 | 2/2007 | Magnussen et al. | |
| 7,175,506 B2 | 2/2007 | Fiebelkorn et al. | |
| 7,196,971 B2 | 3/2007 | Trafford | |
| 7,297,238 B2 | 11/2007 | Nayar et al. | |
| 7,352,110 B2 * | 4/2008 | Hess | 310/328 |
| 7,431,779 B2 | 10/2008 | Statnikov | |
| 7,497,277 B2 * | 3/2009 | Sander et al. | 175/56 |
| 7,816,840 B2 | 10/2010 | Tang et al. | |
| 7,824,247 B1 * | 11/2010 | Bar-Cohen et al. | 451/165 |
| 8,217,775 B2 | 7/2012 | Flick | |
| 2001/0020808 A1 * | 9/2001 | Suzuki et al. | 310/323.12 |
| 2002/0040198 A1 | 4/2002 | Rahman et al. | |
| 2006/0128283 A1 | 6/2006 | Fiebelkorn et al. | |
| 2007/0066191 A1 * | 3/2007 | Ohnishi | 451/165 |
| 2008/0292860 A1 * | 11/2008 | Yagishita | 428/221 |
| 2009/0035087 A1 | 2/2009 | Nakamoto et al. | |
| 2009/0185876 A1 * | 7/2009 | Liao | 408/17 |
| 2011/0155407 A1 * | 6/2011 | Yang et al. | 173/217 |
| 2013/0028675 A1 * | 1/2013 | Vogler et al. | 408/1 R |

FOREIGN PATENT DOCUMENTS

| | | | |
|---|---|---|---|
| DE | 102004056716 A1 * | 6/2006 | |
| GB | 2140345 A | 11/1984 | |
| JP | 59118306 A * | 7/1984 | B23B 37/00 |
| JP | 62140702 A * | 6/1987 | B23B 1/00 |
| JP | 01234106 A * | 9/1989 | B23B 37/00 |
| JP | 2088156 A | 3/1990 | |
| JP | 04046703 A * | 2/1992 | B23B 37/00 |
| JP | 5208349 A | 8/1993 | |
| JP | 09174462 A * | 7/1997 | B25F 5/00 |
| JP | 63306862 A | 12/1998 | |
| JP | 2000042816 A * | 2/2000 | |
| JP | 2005224865 A | 8/2005 | |
| JP | 2006142469 A | 6/2006 | |
| RU | 2250814 C1 * | 4/2005 | |
| WO | WO 9401256 A1 * | 1/1994 | B26D 7/08 |

* cited by examiner

ULTRASONIC MACHINING ASSEMBLY FOR USE WITH PORTABLE DEVICES

CROSS-REFERENCE TO RELATED APPLICATIONS

This patent application claims the benefit of U.S. Provisional Patent Application Ser. No. 61/329,355 filed on Apr. 29, 2010 and entitled "Ultrasonic Machining System" and U.S. Provisional Patent Application Ser. No. 61/333,483 filed on May 11, 2010 and entitled "Ultrasonic Machining System", the disclosures of which are hereby incorporated by reference herein in their entirety and made part of the present U.S. utility patent application for all purposes. This patent application is also a continuation-in-part of U.S. patent application Ser. No. 13/046,099 filed on Mar. 11, 2011 and entitled "Ultrasonic Machining Module", the disclosure of which is hereby incorporated by reference herein in its entirety and made part of the present U.S. utility patent application for all purposes.

BACKGROUND OF THE INVENTION

The described invention related generally to systems for machining materials and more specifically to a system for providing both longitudinal and rotary motion to a tool used for machining very hard materials.

Machining, which is a collective term for drilling, milling, reaming, and turning, is an enabling technology that impacts virtually all aspects of manufacturing in the United States and elsewhere. With regard to a specific example, a milling machine is a machining tool used to machine solid materials, particularly metals. Milling machines are typically classified as either horizontal or vertical, which refers to the orientation of the main spindle. Both types range in size from small, bench-mounted devices to much larger machines suitable for industrial purposes. Unlike a drill press, which holds the workpiece stationary as the drill moves axially to penetrate the material, milling machines move the workpiece axially and radially against the rotating milling cutter, which cuts on its sides as well as its tip. Milling machines are used to perform a vast number of operations, from simple tasks (e.g., slot and keyway cutting, planing, drilling) to complex tasks (e.g., contouring, diesinking)

Improving the machinability of certain materials is of significant interest to manufacturers of military equipment and commercial hardware, as well as to machine tool builders. More specifically, very advanced materials such as armor plates and composites are notoriously difficult to machine with standard methods. High-speed systems and ultra-hard tool bits are used for materials such as these, but provide only a marginal increase in tool life and productivity. Significant improvements in the machinability of materials have been achieved by implementing advanced technologies such as laser, waterjet, and EDM cutting. However, these processes are high in capital cost, limited in application, and differ too much to be used in standard machine shops. Also, their application is limited to certain types of cuts in materials.

Ultrasonic-assisted machining was developed in the United States in the 1950's and was used for machining materials that were considered to be difficult to machine at the time. The more modern process of ultrasonic machining (UM) involves the application of high power ultrasonic vibrations to "traditional" machining processes (e.g., drilling, turning, milling) for improving overall performance in terms of faster drilling, effective drilling of hard materials, increased tool life, and increased accuracy. This is typically accomplished by using high speed steel (HSS) drill bits affixed to a shrink fit collet that is bolted to an ultrasonic (US) transmission line. In this context, UM is not the existing ultrasonic-based slurry drilling process (i.e., impact machining) used for cutting extremely hard materials such as glass, ceramics, quartz. Rather, this type of UM concerns methods for applying high power ultrasonics to drills, mills, reamers, and other tools that are used with modern machining systems.

Although the use of ultrasonics with modern machining systems provides significant and numerous benefits, there are certain technical challenges involved, not the least of which is the incorporation of ultrasonic energy into machining systems that were not originally designed to accommodate this type of energy output. Thus, there is an ongoing need for an ultrasonic machining assembly that is compatible with and that may be incorporated into existing machining systems.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a machining system is provided. This machining system includes an ultrasonic machining assembly and a machining apparatus. The ultrasonic machining assembly further includes a machining tool; a collet adapted to receive the machining tool; and an ultrasonic transducer that is operative to transmit acoustical vibrations to the machining tool. The machining apparatus is adapted to receive the ultrasonic machining assembly and is operative to transmit torque to the machining tool by applying rotary motion to the ultrasonic machining assembly.

In accordance with another aspect of the present invention, a machining system is also provided. This machining system includes an ultrasonic machining assembly and a machining apparatus. The ultrasonic machining assembly further includes a tool; a collet adapted to receive the tool; and a half wave ultrasonic transducer that is operative to transmit acoustical vibrations to the tool. The machining apparatus is adapted to receive the ultrasonic machining assembly and is operative to transmit torque to the tool by applying rotary motion to the ultrasonic machining assembly. An optional half wave extension is positioned between the collet and the ultrasonic transducer.

In yet another aspect of this invention, a drilling system is provided. This drilling system includes an ultrasonic drilling assembly and a drilling apparatus. The ultrasonic drilling assembly further includes a drill bit; a collet adapted to receive the drill bit; and an ultrasonic transducer that is operative to transmit acoustical vibrations to the drill bit. The drilling apparatus is adapted to receive the ultrasonic drilling assembly and is operative to transmit torque to the drill bit by applying rotary motion to the ultrasonic drilling assembly.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

One or more exemplary embodiments of the present invention are now described with reference to the Figures. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention. The present invention permits the integration of high power ultrasonics into conventional machine tools, thereby enhancing current industrial processes. This invention permits the machining industry to effectively harness the benefits of ultrasonic machining through a simplified design that uses common tools such as twist drills, mills, reamers, boring bars, and the like. This is accomplished through the use of a modified acoustic transmission line which acts as the machine's spindle combined with the ability to exert high axial force and torque while operating, for example, at 20-kHz and power levels up to 6-kW. This is compatible with high speed steel, carbide, and specialty coated cutting tools. For certain applications, this invention facilitates access to a drill head assembly, thus permitting ready exchange of twist drills or other tools or devices in a manner expected by tooling manufacturers and users. With reference now to the Figures, one or more specific embodiments of this invention in described in greater detail.

Figure 1:
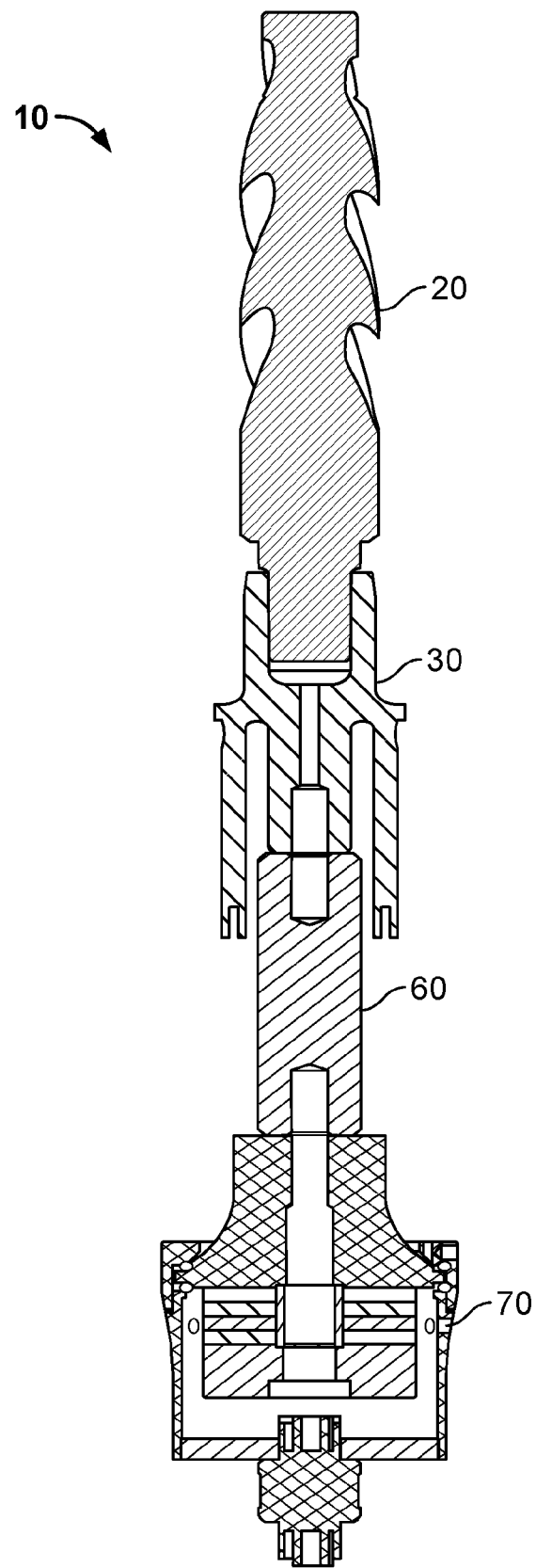
FIG. 1 is a cross-sectional side view of an exemplary embodiment of the ultrasonic machining/drilling assembly of the present invention.
Figure 2A:
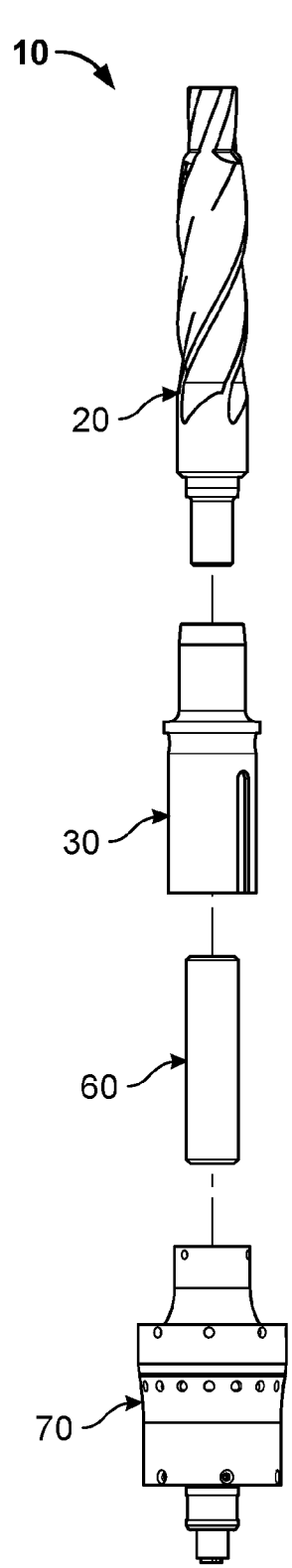
FIGS. 2a-b are an exploded side view and an exploded cross-sectional side view of the ultrasonic machining/drilling assembly of FIG. 1.
Figure 2B:
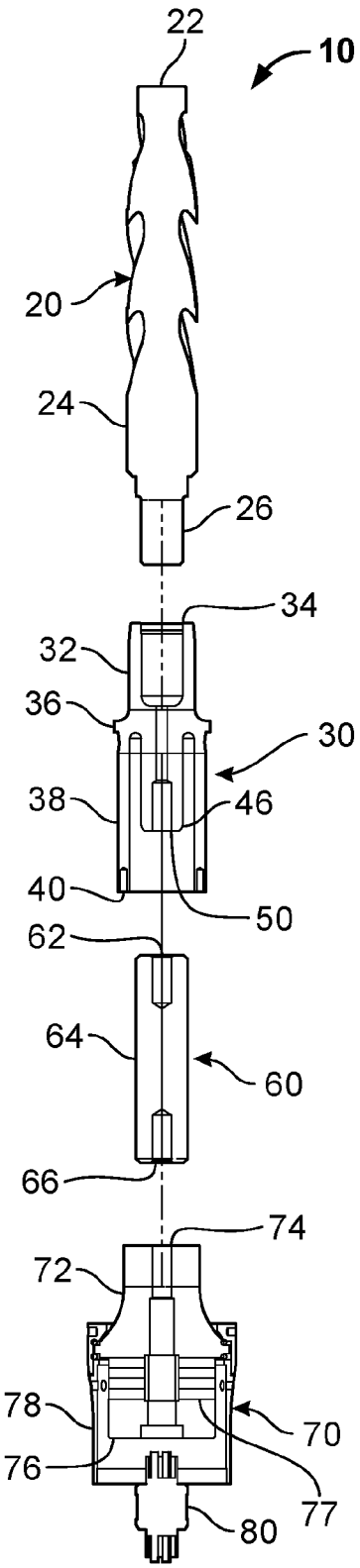
Figure 3A:
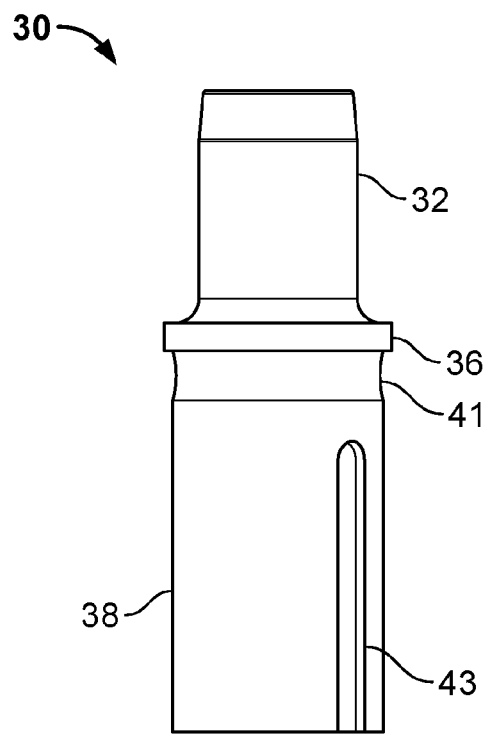
FIGS. 3a-b are an exploded side view and an exploded cross-sectional side view of the collet/mandrel component of the ultrasonic machining/drilling assembly of the present invention.
Figure 3B:
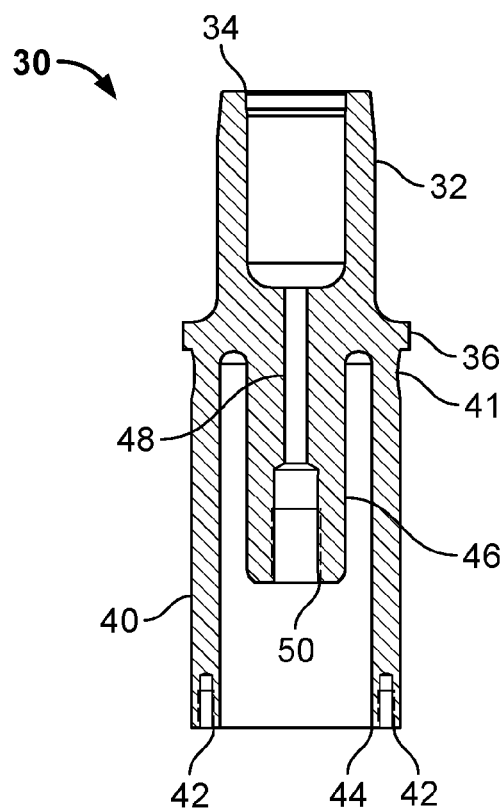

As best shown in FIGS. 1 and 2a-b, an exemplary embodiment of the present invention configured for use with a twist drill (e.g. a Climax drill) or the like, includes ultrasonic machining assembly 10. Ultrasonic machining assembly 10 further includes full-wave drill bit 20, which includes tip 22, body 24, and base 26; collet 30, which functions as both a collet and a mandrel; half-wave extension 60; and half-wave ultrasonic transducer 70, all of which are inserted into and supported by drill head 90, which is slidably mounted on support 94. Drill head 90 rotates ultrasonic machining assembly 10 when the system is in use. Half-wave extension 60 includes first region 62 for receiving a set screw (not shown), an elongated body 64, and a second region 66 for receiving a set screw (not shown). Ultrasonic transducer 70 includes front mass 72, region 74 which is adapted to receive a set screw (not shown), rear mass 76, housing 78, and an electrical connector 80 for connecting the transducer electrodes (not shown) to a power source. A plurality of piezoelectric ceramics is positioned between front mass 72 and rear mass 76. In this embodiment, ½-20 UNF set screws are used to connect half-wave extension 60 to both collet 30 and ultrasonic transducer 70. Ultrasonic transducer 70 provides acoustic vibrational energy to ultrasonic machining assembly 10 when the system is in use.

Figure 4:
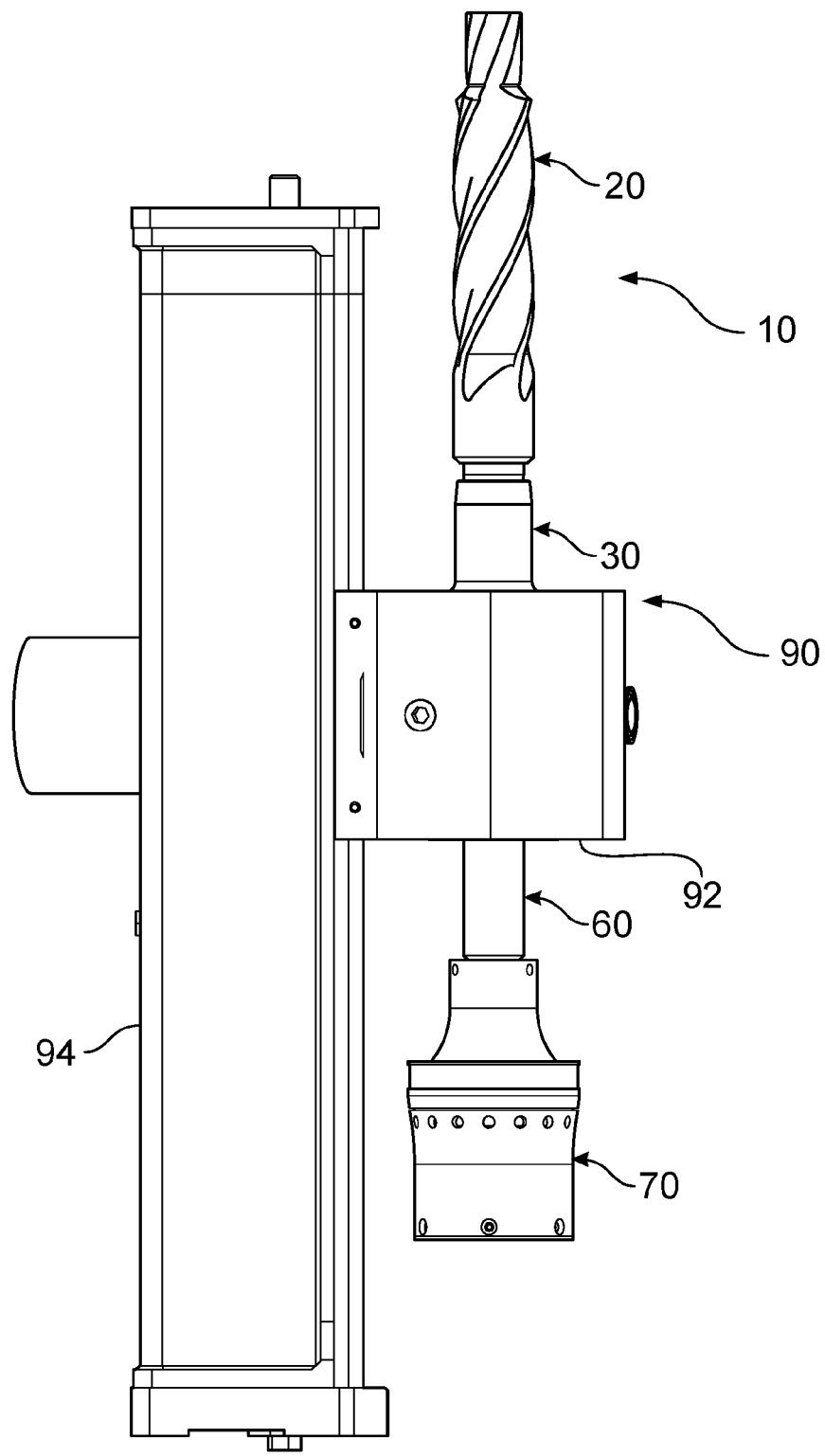
FIG. 4 is a side view of an exemplary ultrasonic machining/drilling assembly mounted within an exemplary machining apparatus.

As best shown in FIGS. 2a-b and 3a-b, collet 30 includes upper shell portion 32, the inner diameter of which defines upper chamber 34. Upper chamber 34 is adapted to receive base 26 of drill bit 20, which is secured therein using a shrink-fit process. By heating the mass around upper chamber 34 uniformly, it is possible to significantly expand the diameter of the chamber. Base 26 is then inserted into the expanded chamber. Upon cooling the mass around the bore shrinks back to its original diameter and frictional forces create a highly effective joint. Collet 30 further includes a rigid nodal point mounting ring 36 and lower shell portion 38. Circumferential undercut 41 (see FIG. 3a) is formed in shell wall 40 as are optional mounts 42 which, in the exemplary embodiment, are 10-32 holes adapted to receive a containment plate which affixes collet 30 to drill head 92 (see FIG. 4), if desired. A slot type cut 43 engages a fixed key inside drill head 92 for transmitting torque from the motor driving drill head 92 to collet 30 once inserted into drill head 92. By this means, torque is then transmitted to the cutting face of drill bit 20 or other machining tool. The inner diameter of shell wall 40 defines lower chamber 44, which is adapted to receive one end of half-wave extension 60. Cylindrical structure 46 extends into lower chamber 44 and includes region 50, which is adapted to receive a set screw (not shown), as well as bore 48, which extends through the center portion of collect 30. Bore 48 is included so that when base 26 is shrink-fit into upper chamber 34, it is unnecessary to overcome the compression of any air trapped in the bottom of chamber 34.

The design of collet 30 isolates all vibrations generated by ultrasonic transducer 70 except the axial vibrations transmitted to drill bit 20; therefore, drill head 92 and the machining system generally are protected from damage that ultrasonic vibrations could potentially cause should such vibrations be transmitted beyond collet 30. More specifically, the relationship between the placement of rigid nodal point mounting ring 36, the thickness of shell wall 40, and the placement of circumferential undercut 41 results in what is essentially zero vibrational motion of collet 30 at the mounting position of ultrasonic machining assembly 10 within a machining system. Basically, this invention provides a rigid mount system that includes a clamping location that has been isolated from ultrasonic vibrations, yet is still capable of transmitting high torque to a machining tool. Additionally, changing out defective, damaged, or worn machining tools requires only the removal of the collet containing the machining tool, whereas prior practices required the complete disassembly of the stack for tool replacement. Accordingly, the present invention significantly reduces the time and effort needed for replacing tools and also results in dramatic improvements in tool life.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A machining system, comprising:
   (a) an ultrasonic machining assembly, wherein the ultrasonic machining assembly further includes:
      (i) a machining tool;
      (ii) a collet adapted to receive the machining tool, wherein the collet further includes:
         a) a first or upper portion defining a chamber therein;
         b) a second or lower portion, wherein the lower portion further includes an outer shell wall, an inner chamber defined by the outer shell wall, and a cylindrical extension formed in the inner chamber;
         c) a rigid nodal point mounting ring formed between the upper and lower portions; and
         d) a circumferential undercut formed in the outer shell wall of the lower portion directly beneath the rigid nodal point mounting ring; and
      (iii) an ultrasonic transducer, wherein the ultrasonic transducer is operative to transmit acoustical vibrations to the machining tool; and
   (b) a machining apparatus, wherein the machining apparatus is adapted to receive the ultrasonic machining assembly, and wherein the machining apparatus is operative to transmit torque to the machining tool by applying rotary motion to the ultrasonic machining assembly.

2. The machining system of claim 1, further comprising a half-wave extension positioned between the collet and the ultrasonic transducer.

3. The machining system of claim 1, wherein the machining tool is a drill bit.

4. The machining system of claim 1, wherein the collet is operative to isolate acoustical vibrations generated by the ultrasonic transducer from the machining apparatus while still transmitting both longitudinal motion and rotary motion to the machining tool.

5. The machining system of claim 1, wherein the machining tool is secured within the chamber of the upper portion of the collet by a shrink-fit process.

6. The machining system of claim 1, wherein the ultrasonic transducer is a half-wave transducer.

7. A machining system, comprising:
   (a) an ultrasonic machining assembly, wherein the ultrasonic machining assembly further includes:
      (i) a tool;
      (ii) a collet adapted to receive the tool, wherein the collet further includes:
         a) a first or upper portion defining a chamber therein;
         b) a second or lower portion, wherein the lower portion further includes an outer shell wall, an inner chamber defined by the outer shell wall, and a cylindrical extension formed in the inner chamber;
         c) a rigid nodal point mounting ring formed between the upper and lower portions; and
         d) a circumferential undercut formed in the outer shell wall of the lower portion directly beneath the rigid nodal point mounting ring; and
      (iii) an ultrasonic transducer, wherein the ultrasonic transducer is operative to transmit acoustical vibrations to the tool; and
   (b) a machining apparatus, wherein the machining apparatus is adapted to receive the ultrasonic machining assembly, and wherein the machining apparatus is operative to transmit torque to the tool by applying rotary motion to the ultrasonic machining assembly; and
   (c) a half-wave extension positioned between the collet and the ultrasonic transducer.

8. The machining system of claim 7, wherein the machining system is a twist drill.

9. The machining system of claim 7, wherein the tool is a drill bit.

10. The machining system of claim 7, wherein the collet is operative to isolate acoustical vibrations generated by the ultrasonic transducer from the machining apparatus while still transmitting both longitudinal motion and rotary motion to the tool.

11. The machining system of claim 7, wherein the tool is secured within the chamber of the upper portion of the collet by a shrink-fit process.

12. A drilling system, comprising:
   (a) an ultrasonic drilling assembly, wherein the ultrasonic drilling assembly further includes:
      (i) a drill bit;
      (ii) a collet adapted to receive the drill bit, wherein the collet further includes:
         a) a first or upper portion defining a chamber therein;
         b) a second or lower portion, wherein the lower portion further includes an outer shell wall, an inner chamber defined by the outer shell wall, and a cylindrical extension formed in the inner chamber;
         c) a rigid nodal point mounting ring formed between the upper and lower portions; and
         (d) a circumferential undercut formed in the outer shell wall of the lower portion directly beneath the rigid nodal point mounting ring; and
      (iii) an ultrasonic transducer, wherein the ultrasonic transducer is operative to transmit acoustical vibrations to the drill bit; and
   (b) a drilling apparatus, wherein the drilling apparatus is adapted to receive the ultrasonic drilling assembly, and wherein the drilling apparatus is operative to transmit torque to the drill bit by applying rotary motion to the ultrasonic drilling assembly.

13. The drilling system of claim 12, further comprising a half-wave extension positioned between the collet and the ultrasonic transducer.

14. The drilling system of claim 12, wherein the collet is operative to isolate acoustical vibrations generated by the ultrasonic transducer from the drilling apparatus while still transmitting both longitudinal motion and rotary motion to the drill bit.

15. The drilling system of claim 12, wherein the drill bit is secured within the chamber of the upper portion of the collet by a shrink-fit process.

16. The drilling system of claim 12, wherein the ultrasonic transducer is a half-wave transducer.

17. The drilling system of claim 12, wherein the drilling apparatus is a hydraulic drilling apparatus.

* * * * *